United States Patent [19]

Friedmann

[11] 4,328,118

[45] May 4, 1982

[54] ALGAE PROCESSING

[75] Inventor: Eric H. Friedmann, Rosebank, South Africa

[73] Assignee: Ecological Consultants (Proprietary) Ltd., Athlone Industria, South Africa

[21] Appl. No.: 48,068

[22] Filed: Jun. 13, 1979

[51] Int. Cl.³ .......................... B01J 13/00; B01F 5/08
[52] U.S. Cl. .................................. 252/314; 252/311; 252/359 C; 252/359 D
[58] Field of Search ........... 252/314, 303, 311, 359 C, 252/359 D; 47/1.4

[56] References Cited

U.S. PATENT DOCUMENTS

| | | | |
|---|---|---|---|
| 1,653,026 | 12/1927 | Thornley et al. | 252/311 |
| 1,934,637 | 11/1933 | Rafton | 252/314 X |
| 2,369,744 | 2/1945 | Lindsey | 252/314 X |
| 2,620,335 | 12/1952 | Nielsen et al. | 47/1.4 X |
| 3,032,430 | 5/1962 | Heller | 252/314 X |

Primary Examiner—Richard D. Lovering
Attorney, Agent, or Firm—Larson and Taylor

[57] ABSTRACT

A method and apparatus of processing algae. Algae, in its natural wet state, is cut into pieces until in colloid form and then homogenized. Suitable apparatus includes, in series, a mincer-cutter unit, a colloid mill and a homogenizing unit. High temperatures and chemicals are avoided.

8 Claims, 7 Drawing Figures

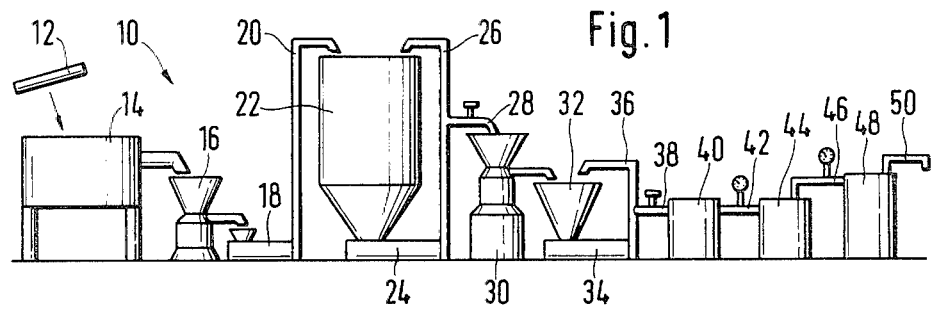
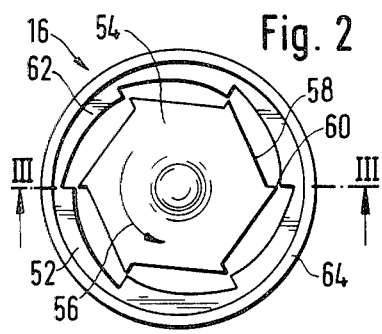
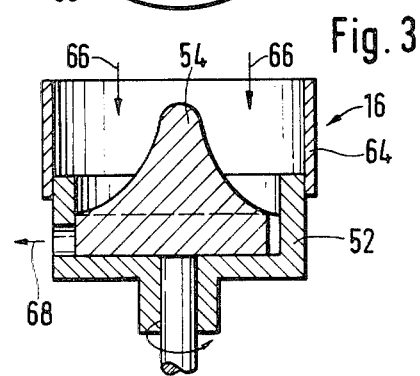
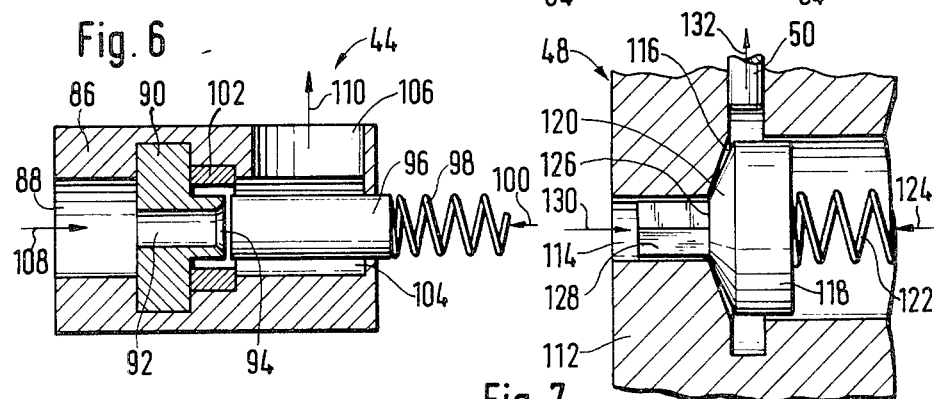

ALGAE PROCESSING

BACKGROUND

The present invention relates to algae processing.

Numerous types of algae plants are known, these have various uses, such as for medicine, foodstuffs, cosmetics and fertilizers. A basic step in the processing of algae plants is to provide the algae material into paste or flowable form. Various methods are known to achieve this result. Firstly there is the fresh frozen method where the algae plant is frozen and the crushed. Secondly, there is a further method in which the algae plant is dehydrated and dried. This is attained in various manners, for instance by heating and then crushing, or by applying chemicals, or by a combination of these methods.

A problem in the processing of algae plant material is that the fresh material, in its wet state, is slippery and difficult to handle and process.

It is an object of the invention to provide a method of algae processing by way of which algae plant material is processed while in its natural wet state.

THE PRESENT INVENTION

According to the invention, a method of processing algae includes the step of applying a physical force to algae material, which is in its natural wet state as obtained from algae plants, in order to break down the algae material to particles of minute size.

The force may be applied by homogenizing the algae material.

The method may include the step of cutting the algae material into smaller parts until in colloid form and thereafter homogenizing the colloid material.

The algae material may be homogenized at a pressure of not less than 400 bar.

The method may include the step of initially cleaning the algae plants to remove impurities.

The temperature of the homogenized algae material may be kept below 50° C.

Also according to the invention, a plant for processing algae includes in series a mincer-cutter unit, a colloid mill, and a homogenizing unit.

A holding tank may be provided between the colloid mill and the homogenizing unit, the holding tank being provided with a circulating feed pump.

A second colloid mill may be provided downstream of the holding tank.

A second holding tank with a circulating feed pump may be provided downstream of the second colloid mill.

The homogenizing unit may include three parts in series, namely a high pressure pump, a first high pressure homogenizing valve and a final homogenizing pressure valve, in which in operation the pump pressure is not less than 400 bar.

The algae plants may be any one or more of the following types:

1. *Ecklonia Maxima*
2. *Laminaria Pallida*
3. *Macrocystis Longifolium.*

The invention will now be described by way of example with reference to the accompanying schematic drawings.

In the drawings there is shown in

FIG. 1 a schematic layout of a plant for processing algae in accordance with the invention;

FIG. 2 a plan view of the stator and rotor parts of a first colloid mill;

FIG. 3 a sectional side view of the stator and rotor parts seen along arrows III—III in FIG. 2;

FIG. 4 a plan view of stator and rotor parts of a second colloid mill;

FIG. 5 a sectional side view of the stator and rotor parts seen along arrows V—V in FIG. 4;

FIG. 6 a sectional side view of the first homogenizer valve; and

FIG. 7 a sectional side view of the final homogenizer valve.

Referring to FIG. 1, the algae processing plant 10 includes various units. The algae plants, which are pre-cleaned to remove all impurities e.g. by washing and scraping, are first cut into suitable tubular lengths 12 by a cutting unit. However this step also may be done manually. Suitable lengths are in the region of 500 to 1,000 mm.

Thereafter the cut parts are supplied to a worm gear and plate mincer 14. In the mincer 14 the material is cut and forced into smaller blocks or parts and is fed to a first colloid mill 16. Details of the stator and rotor of the colloid mill are given in FIGS. 2 and 3. Thereafter the material is supplied to a pump 18 which pumps it via conduit 20 into a holding tank 22. A circulating feed pump 24 removes the material from the holding tank 22 and circulates the material via the conduit 26 into the tank 22. Part of the material is pumped via conduit 28 to a second colloid mill 30. Details of the stator and rotor of the colloid mill 30 are given in FIGS. 4 and 5.

Thereafter the material is supplied to a further holding tank 32 which is provided with a circulating feed pump 34. The circulating feed pump 34 pumps the material via the conduit 36 back into the tank 32. Part of the material is pumped via the conduit 38 to a high pressure pump 40. This high pressure pump 40 pumps the material under a pressure of about 500 bar via a conduit 42 to a first high pressure homogenizer valve 44. From there the material is forced through conduit 46 at a pressure of about 50 bar to a final homogenizer pressure valve 48. From here the material is withdrawn via the conduit 50 in a micronized form having a size of about 50 microns.

In FIGS. 2 and 3 details of the stator and rotor colloid mill 16 are given. The colloid mill 16 has a stator 52 in which a rotor 54 rotates in the direction of arrow 56. The rotor 54 has blades 58. A small clearance exists between the tips 60 of the blades 58 and the projections 62 on the inside of the stator 52. The material is fed in the guide housing 64 in the direction of arrow 66 and leaves through an annular outlet in the stator 52 in the direction of arrow 68.

In FIGS. 4 and 5 the stator and rotor of the second colloid mill 30 are illustrated. Here a stator 70 and a rotor 72 are provided. The stator 70 is in the form of a perforated plate. The rotor 72 has two oppositely extending blades 74 and 76. The blades 74, 76 are triangularly shaped in cross-section as is shown in FIG. 5, and at their bottom end carry a cutter sliding just above the perforated stator plate 70. The rotor 72 is rotatable in the direction indicated by arrow 78. A small clearance exists between the undersides (i.e. namely of the cutters) of the stator blades 74 and 76 and the perforated stator plate 70. Material is fed in the housing guide 80 in the direction of arrow 82, is forced by the cutters through the plate 70 and leaves in the direction of arrow 84.

Referring to FIG. 6, a cross-section of the first stage homogenizer pressure valve 44 is shown. The valve 44 includes a housing 86 having a supply passage 88 connected to the conduit 42. A valve seat 90 is provided in the housing 86 and reduces the passage 88 into a restricted passage 92. The outlet 94 of the passage 92 is closed off by a valve 96, which is biased by means of a spring 98 in the direction indicated by arrow 100. The outlet 94 leads past a wear, or impact or breaker ring 102 into a discharge chamber 104, which opens into a discharge passage 106. The passage 106 is joined to the conduit 46 shown in FIG. 1.

Material is supplied under pressure into the passage 88 to flow in the direction indicated by arrow 108. The pressure of the valve 96 is adjusted by means of the spring 98 acting on it and the material supplied in the direction of arrow 108 in the passage 88 has to force this valve 96 away. The material particles shear against each other, are deformed and disrupted. The impingement on the hard surface of the wear ring 102, which is set in a direction normal to the direction of flow from the outlet 94, further promotes disruption of the particles. The sudden drop in the pressure as the material leaves the outlet 94, probably also contributes to the reduction in particle size. The material then flows out in the direction of arrow 110 in the passage 106.

In FIG. 7 a cross-section of the final pressure valve 48 is illustrated. It includes a housing 12 having a round passage 114 joined to the conduit 46. The passage 114 opens into a conically widening annular passage 116 leading to the conduit 50. A valve 118 with a conical part 120 is biased by means of the spring 122 in the direction of arrow 124 to close off the opening 126 of the passage 114. The valve 118 has an extension guide rod 128 which is triangularly shaped in cross-section.

Material is forced in the direction of arrow 130 in the space between the triangular rod 128 and the passage 114 and forces the valve 118 back. Once again the material particles shear against each other and are deformed and disrupted. The material, now in minute particle size of about 50 micron (depending on the pressure applied), passes out through the discharge passage 50 in the direction of arrow 132.

In the specification and claims the term "homogenizing" is to refer to the operation in which the desired reduction of the size of the particles is brought about by a high pressure forcing wet algae material through an opening.

By applying the method in accordance with the invention to process algae, the slippery condition of wet algae plants offers no problems requiring freezing or heating or adding any chemicals to be able to process the algae material.

If required the algae material may be screened at any intermediate stage in order to remove any impurities or oversized particles.

A particular advantage achieved with products obtained by means of a process in accordance with the invention, is that growth regulators, trace elements and other nutrients found in algae, are not destroyed due to the fact that a cold concentration process is applied. Where heat and/or chemicals are added such constituents of algae often are destroyed.

I claim:

1. In a method of processing algae material in which algae material is provided in a paste or flowable form, the improvement wherein the method comprises:
    providing algae material which is in its natural wet state as obtained from algae plants,
    cutting the algae material in its natural wet state into smaller parts until it is in colloid form, and
    homogenizing the material in colloid form whereby the algae material is broken down into paste or flowable form comprising particles of minute size, said improved method being effected without freezing or heating of the algae material and without the addition of chemicals to enable processing of the algae material.

2. A method as claimed in claim 1, in which the algae material is homogenized at a pressure of not less than 400 bar.

3. A method as claimed in claim 1, which includes the step of initially cleaning the algae plants to remove impurities.

4. A method as claimed in claim 1, in which the temperature of the homogenized algae material is kept below 50° C.

5. A method according to claim 1 wherein the step of cutting the algae material comprises subjecting the algae material to the action of a mincer-cutter and, thereafter, a colloid mill.

6. A plant for processing algae, which comprises, in series, a mincer-cutter unit, a colloid mill, a holding tank provided with a circulating feed pump, a second colloid mill down-stream of the holding tank, and a homogenizing unit.

7. A plant as claimed in claim 6, in which a second holding tank with a circulating feed pump is provided downstream of the second colloid mill.

8. A plant as claimed in claim 6, in which the homogenizing unit includes three parts in series, namely a high pressure pump, a first high pressure homogenizing valve and a final homogenizing pressure valve in which, in operation, the pump pressure is not less than 400 bar.

* * * * *